US006733583B2

(12) United States Patent
Frailey et al.

(10) Patent No.: US 6,733,583 B2
(45) Date of Patent: May 11, 2004

(54) PROCESS FOR PRODUCING A BLENDED CEMENT HAVING ENHANCED CEMENTITIOUS PROPERTIES CAPABLE OF COMBINATION WITH CLASS C FLY ASH

(75) Inventors: Max L. Frailey, San Antonio, TX (US); John G. Wheeler, San Antonio, TX (US)

(73) Assignee: Capitol Aggregates, Ltd., San Antonio, TX (US)

( * ) Notice: Subject to any disclaimer, the term of this patent is extended or adjusted under 35 U.S.C. 154(b) by 122 days.

(21) Appl. No.: 10/095,219

(22) Filed: Mar. 11, 2002

(65) Prior Publication Data

US 2002/0129743 A1 Sep. 19, 2002

Related U.S. Application Data

(60) Provisional application No. 60/275,765, filed on Mar. 14, 2001.

(51) Int. Cl.[7] .............................................. C04B 18/06
(52) U.S. Cl. ....................................... 106/705; 106/745
(58) Field of Search ................................. 106/705, 745

(56) References Cited

U.S. PATENT DOCUMENTS

| | | | |
|---|---|---|---|
| 1,886,933 A | 11/1932 | Askenasy | |
| 1,942,769 A | 1/1934 | Peffer et al. | |
| 2,140,850 A | 12/1938 | Palmieri et al. | |
| 2,250,107 A | 7/1941 | Nelles | |
| 2,313,107 A | 3/1943 | Wertz | |
| 2,446,990 A | 8/1948 | Schuetz | |
| 2,564,690 A | 8/1951 | Havelin et al. | |
| 2,565,107 A | 8/1951 | Watts | |
| 2,695,669 A | 11/1954 | Sidwell | |
| 2,698,252 A | 12/1954 | Havelin et al. | |
| 2,858,227 A | 10/1958 | Rodsky | |
| 2,902,379 A | 9/1959 | McCollum et al. | |
| 2,933,796 A | 4/1960 | Somogyi | |
| 2,946,112 A | 7/1960 | Tucker et al. | |
| 2,980,548 A | 4/1961 | Hampton | |
| 3,565,648 A | 2/1971 | Mori et al. | |
| 3,585,155 A | 6/1971 | Hollstein | |
| 3,669,700 A | 6/1972 | Beach et al | |
| 3,669,701 A | 6/1972 | Biederman, Jr. | |
| 3,852,084 A | 12/1974 | Webster et al. | |
| 3,854,968 A | 12/1974 | Minnick et al. | |
| 4,210,457 A | 7/1980 | Dodson et al. | |
| 4,222,785 A | * 9/1980 | Henderson | |
| 4,240,952 A | 12/1980 | Hulbert, Jr. et al. | |
| 4,256,504 A | 3/1981 | Dunstan, Jr. | |
| 4,268,316 A | 5/1981 | Wills, Jr. | |
| 4,328,037 A | 5/1982 | Demirel et al. | |
| 4,336,069 A | 6/1982 | Dodson et al. | |
| 4,344,796 A | 8/1982 | Minnick | |
| 4,453,978 A | 6/1984 | Okimura et al. | |
| 4,749,413 A | 6/1988 | Tomic | |
| 4,756,761 A | 7/1988 | Philip et al. | |
| 4,992,102 A | 2/1991 | Barbour | |
| 5,223,035 A | 6/1993 | Hopkins et al. | |
| 5,266,111 A | 11/1993 | Barbour | |
| 5,275,654 A | 1/1994 | Cowan | |
| 5,435,843 A | 7/1995 | Roy et al. | |
| 5,439,518 A | 8/1995 | Francis et al. | |
| 5,565,028 A | 10/1996 | Roy et al. | |
| 5,569,324 A | 10/1996 | Totten et al. | |
| 5,626,665 A | 5/1997 | Barger et al. | |
| 5,723,226 A | 3/1998 | Francis et al. | |
| 5,976,243 A | 11/1999 | Oates et al. | |
| 6,572,697 B2 | * 6/2003 | Gleeson et al. ............. | 106/705 |

* cited by examiner

Primary Examiner—Paul Marcantoni
(74) Attorney, Agent, or Firm—Jackson Walker, LLP

(57) ABSTRACT

The present invention provides a method of producing a blended cement capable of meeting ASTM C-595 and C-1157 standards. The blended cement of the present invention contains portland cement clinker, calcium sulfate and volcanic ash. The volcanic ash utilized by the present invention has been subjected to heat in the range of between 800° F. and 1300° F. and contains between 40% and 45% hollow spheres unable to pass #325 sieve. The portland cement clinker, calcium sulfate and volcanic ash are interground to an ultimate blaine fineness of between 350 m²/kg and 500 m²/kg to produce a blended cement capable of subsequent admixing with class C fly ash to produce synergistic effects. Specifically, the addition of class C fly ash to the blended cement containing interground volcanic ash, portland cement clinker, and calcium sulfate is capable of producing an ultimate blended cement exhibiting improved sulfate resistance, improved workability, reduced permeability with regard to chlorides and sulfates, improved resistance to ASR and elimination of delayed ettringite formation.

20 Claims, 1 Drawing Sheet

PROCESS FOR PRODUCING A BLENDED CEMENT HAVING ENHANCED CEMENTITIOUS PROPERTIES CAPABLE OF COMBINATION WITH CLASS C FLY ASH

This patent application claims priority from a provisional patent application entitled "A Process for Producing a Blended Cement having Enhanced Cementitious Properties Capable of Combination with Class C Fly Ash" having Ser. No. 60/275,765, and a filing date of Mar. 14, 2001.

FIELD OF THE INVENTION

The present invention relates generally to methods of producing compositions and, more particularly, to a method of producing a blended cement having enhanced cementitious properties.

BACKGROUND OF THE INVENTION

Portland cement is widely used in construction applications. Portland cement is composed primarily of calcium silicate and calcium aluminate minerals capable of reacting with water to form a dense, solid paste. The reaction products of portland cement are calcium silicate hydrate, ettringite in the poorly-crystalizine phase, and calcium hydroxide occupying a majority of the pore spaces. Although portland cement is a widely utilized construction material, it is not without drawbacks.

To illustrate, portland cement concrete has a relatively high permeability to water. Accordingly, portland cement concrete structures are susceptible to deterioration if water containing sulfates is allowed to enter the pore structure. Such deterioration may include damage to the concrete as well as corrosion of metal reinforcing bars. In addition to high permeability, portland cement releases heat upon hydration that may lead to thermal cracking in mass concrete structures. Also, the burning process required for the production of portland cement clinker causes considerable emissions of $NO_x$, $SO_x$ and $CO_2$, often referred to as greenhouse gases.

In an effort to improve the performance of portland cement concrete, supplementary cementing materials (SCMs), such as fly ash, may be combined with portland cement to produce a blended cement. Fly ash is typically a by-product of burning coal, generated during the production of electricity at coal-fired power plants.

Fly ash typically contains about 85% glassy, amorphous components. ASTM C 618-85 ("Standard Specification for Fly Ash and Raw Calcined natural Pozzolan for Use as a Mineral Admixture in Portland Cement Concrete, pp385–388 (1985)) has classified fly ash into two classes, Class C and Class F. Class F fly ash typically contains more than 70% by weight of silica, alumina, and ferric oxides, while Class C typically contains between 70% and 50%. Class C fly ash is usually high in calcium and produced as a by-product of the combustion of lignite or sub-bituminous coal.

Generally, cements containing SCMs exhibit improved later strength in concrete (lower cement factors for equal 28 day strength), improved sulfate resistance, lower heat of hydration in mass concrete, improved durability, and reduced resistance to alkali-silica reactivity (ASR). Also, the use of SCMs in the production of concrete is an environmentally friendly option. Each pound of portland cement clinker that is replaced by a SCM does not require the aforementioned burning process, thus sparing the environment from such emissions.

Although blended cements are preferable to portland cement for a variety of applications, it is often not economically viable for a cement manufacturer to produce a blended cement for sale to the concrete producer. Fly ash, especially class C fly ash, is inexpensive and easy to acquire. In short, the concrete producer is not likely to pay portland cement prices for a blended cement. A blended cement, by definition, replaces a portion of the portland cement with relatively inexpensive fly ash. Thus, from an economic standpoint, the concrete producer is more likely to buy portland cement and a supplementary cementing material(s) separately and mix them at the concrete mixer. In doing so, the concrete producer maintains control of the concrete's mixture ratio. By adjusting the amount of SCMs at the concrete mixer, the concrete producer is able to vary concrete characteristics such as compressive strength, setting time, sulfate resistance, heat resistance, workability, and ASR resistance.

Recent studies by the Texas Department of Transportation (TxDOT) have shown that blended cements containing a mixture of portland cement and class C fly ash are often ineffective in preventing ASR and, in some cases, contribute to concrete deterioration. As a result, TxDOT has virtually banned the use of class C fly ash for State of Texas projects that require ASR and sulfate resistance. Specifically, class C fly ash may only be used in these applications if testing confirms that the resulting concrete conforms to ASR and sulfate resistance standards as set forth in ASTM C-595 and ASTM C-1157.

There remains a need for a blended cement capable of exhibiting ASR and sulfate resistance properties while still allowing the addition of class C fly ash at the concrete mixer.

SUMMARY OF THE INVENTION

Accordingly, the present invention provides a method of producing a blended cement capable of meeting ASTM C-595 and C-1157 standards. The blended cement of the present invention contains portland cement clinker, calcium sulfate and volcanic ash that has been subjected to heat in the range of between 800° F. and 1300° F. and contains coarse particles which must be ground for activation.

The portland cement clinker, calcium sulfate and volcanic ash utilized by the present invention are interground to an ultimate blaine fineness of between 350 $m^2$/kg and 500 $m^2$/kg. The resulting blended cement of the present invention is capable of subsequent admixing with class C fly ash to produce synergistic effects. Specifically, the addition of class C fly ash to the blended cement containing interground volcanic ash, portland cement clinker, and calcium sulfate is capable of producing an ultimate blended cement exhibiting improved sulfate resistance, improved workability, reduced permeability with regard to chlorides and sulfates, improved resistance to ASR and elimination of delayed ettringite formation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
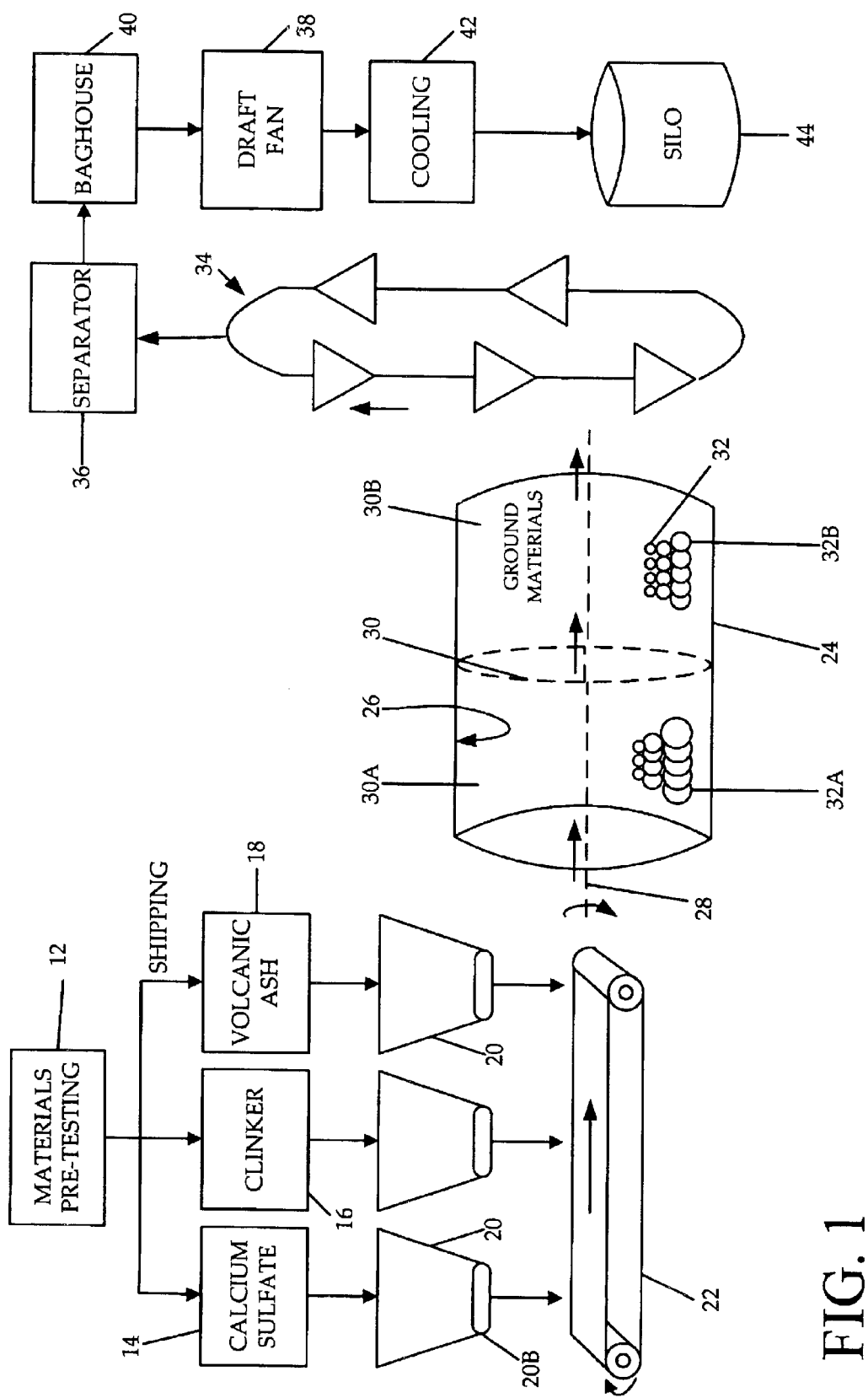
FIG. 1 is a process flow diagram illustrating the blended cement production process of one embodiment of the present invention.

The present invention is herein described as a method of producing a blended cement meeting ASTM C-595 and C-1157 standards. In one embodiment, the method of the present invention utilizes calcium sulfate (14), portland cement clinker (16), and volcanic ash (18) to produce a blended cement capable of exhibiting ASR and sulfate resistance while still allowing the addition of Class C fly ash at the concrete mixer.

Referring to FIG. 1, each material (14, 16 and 18, respectively) is sampled and pre-tested to insure that it each material is suitable for use with blended cement. In one embodiment, the present invention utilizes portland cement clinker (16) suitable for use in producing portland cement, as specified by ASTM C-150. For example, in one embodiment of the invention, Type I or Type III portland cement clinker is used. The present invention uses calcium sulfate, usually in the form of gypsum, that has been extracted from a natural source or utilized as a by-product of a previous industrial process.

In one embodiment, the volcanic ash (18) utilized by the present invention is subjected to heat in the range of between 800° F. and 1300° F. prior to admixing with calcium sulfate (14) and portland cement clinker (16). In another embodiment, the volcanic ash (18) is taken from the Jackson Formation located in Atascosa County, Tex., and is subjected to between 800° F. and 1300° F. at the San Miguel Electric Cooperative in the course of electric power generation. Between 40% and 45% of the volcanic ash (18) utilized by the present invention contains particles unable to pass #325 sieve. In one embodiment, at least a portion of the particles of volcanic ash (18) unable to pass #325 sieve are substantially hollow spheres. In one embodiment, the volcanic ash (18) utilized by the present invention has a specific gravity between about 1.7 $g/cm^3$ and 1.8 $g/cm^3$.

Volcanic ash (18), a SCM, comprises at least a portion of the blended cement produced by the method of the present invention. In one embodiment, volcanic ash (18) comprises between 15% and 30% of the total weight of the blended cement. In another embodiment, the volcanic ash comprises about 25% of the total weight of the blended cement. By using volcanic ash (18) instead of a corresponding amount of portland cement clinker, the method of the present invention reduces the cost of production as well as greenhouse gas emissions. Additionally, the use of volcanic ash containing between 40% and 45% hollow spheres that has been subjected to between 800° F. and 1300° F. results in a blended cement with enhanced properties. Specifically, the resulting blended cement is capable of admixing with Class C fly ash at the concrete mixer to produce an ultimate blended cement exhibiting improved sulfate resistance, improved workability, reduced permeability with regard to chlorides and sulfates, improved resistance to ASR and elimination of delayed ettringite formation.

Once the materials have been shipped to the processing plant, they are placed separately into pre-assigned bins (20). In one embodiment of the present invention, these bins (20) have a cone shaped bottom (20B) capable of facilitating the efficient movement of each material (14, 16 and 18, respectively). In another embodiment, mass flow bins (not shown) are used to facilitate the movement of by-product gypsum. Pre-calibrated weigh feeders (not shown) may also be used to discharge materials from each bin onto a substantially horizontal collecting belt (22). The collecting belt (22) utilized by the present invention transports each material (14, 16 and 18, respectively) from the bins (20) to the finish mill (24) for grinding.

In one embodiment of the present invention, the finish mill (24) may be a vertical roller mill or have a generally cylindrical shape and a length to diameter ratio of about 1:3. The inner surface (26) of the finish mill (24) is lined with heavy metal plates to protect the structure from damage. In one embodiment, the finish mill (24) is rotated about an axis of rotation (28) via an electric motor at a predetermined rate to maximize movement of grinding balls (32) therein. In one embodiment, the finish mill (24) rotates at between 12 to 20 revolutions per minute.

The finish mill (24) of the present invention is divided into two compartments (30A and 30B, respectively) by a diaphragm (30). The first compartment (30A), or feed end, of the finish mill contains grinding balls (32) having a diameter of up to 4 inches. The grinding balls present in the first compartment (30A) are used to impact and grind large pieces of material (14, 16 and 18, respectively). Materials (14, 16 and 18, respectively) are ground to a predetermined size so that they may proceed to the second compartment (30B) through perforations in the diaphragm (30). The second compartment (30B) of the finish mill contains grinding balls (32B) having a diameter as small as ¾ of an inch.

In one embodiment of the present invention, the materials are ground to a predetermined Blaine Fineness in the range of between 180 $m^2$/kg and 300 $m^2$/kg. The bucket elevator then transports the ground materials to a separator (36) designed to classify interground material by particle size. In one embodiment of the present invention, the materials (14, 16 and 18, respectively) are ground together to a predetermined fineness of between 350 $m^2$/kg and 500 $m^2$/kg to produce a blended cement exhibiting ASR and sulfate resistance while still allowing the addition of Class C fly ash at the concrete mixer.

The separator (36) utilized by the present invention rejects interground material that does not exhibit the desired predetermined fineness and returns the material to the finish mill (24) for further processing. The blended cement of the present invention is transported by an induced draft fan (38) into cloth filter bag house (40) designed to retain solid particles. In one embodiment, the blended cement is passed through a cooling system (42) prior to transport to the silo. Once cooled, an air pump (not shown) is used to move the blended cement from the filter bag house into a storage silo (44).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of producing a blended cement comprising the steps of:
   providing a quantity of cementitious material, said material including inactive volcanic ash that has been heated to between 800° F. and 1300° F.;
   providing a quantity of portland cement clinker;
   providing a quantity of calcium sulfate;
   intergrinding said quantity of said cementitious material, said quantity of said clinker and said quantity of said calcium sulfate; and
   mixing said interground quantities to form a homogeneous mixture capable of meeting ASTM C-595 and ASTM C-1157 standards.

2. The method of claim 1, further comprising the additional step of:

admixing a quantity of said homogeneous mixture with class C fly ash to produce an ultimate blended cement capable of meeting ASTM C-595 and ASTM C-1157 standards, said volcanic ash and said class C fly ash in combination comprising about 50% of the total weight of said ultimate blended cement.

3. The method of claim 1, wherein said volcanic ash comprises between about 10% and about 30% of the total weight of said homogeneous mixture and said clinker comprises Type I or Type III portland cement clinker.

4. The method of claim 1, wherein said volcanic ash comprises about 25% of the total weight of said homogeneous mixture and said clinker comprises Type I or Type III portland cement clinker.

5. The method of claim 1, wherein said volcanic ash has a specific gravity of between about 1.7 g/cm$^3$ and about 1.8 g/cm$^3$.

6. The method of claim 3, further comprising the additional step of:
   intergrinding said quantity of said cementitious material, said quantity of said clinker and said quantity of said calcium sulfate to a fineness of between about 180 m$^2$/kg and about 300 m$^2$/kg.

7. The method of claim 3, further comprising the additional step of:
   intergrinding said quantity of said cementitious material, said quantity of said clinker and said quantity of said calcium sulfate to a fineness of between about 350 m$^2$/kg and about 500 m$^2$/kg.

8. The method of claim 4, further comprising the additional step of:
   intergrinding said quantity of said cementitious material, said quantity of said clinker and said quantity of said calcium sulfate to a fineness of between about 180 m$^2$/kg and about 300 m$^2$/kg.

9. The method of claim 4, further comprising the additional step of:
   intergrinding said quantity of said cementitious material, said quantity of said clinker and said quantity of said calcium sulfate to a fineness of between about 350 m$^2$/kg and about 500 m$^2$/kg.

10. A method of producing a blended cement comprising the steps of:
    providing a quantity of cementitious material, said material comprising an inactive volcanic ash that has been heated to between 800° F. and 1300° F., between about 40% and about 45% of said volcanic ash comprising particles unable to pass #325 sieve, said volcanic ash having a specific gravity of between about 1.7 g/cm$^3$ and about 1.8 g/cm$^3$
    providing a quantity of portland cement clinker;
    providing a quantity of calcium sulfate;
    intergrinding said quantity of said cementitious material, said quantity of said clinker and said quantity of said calcium sulfate to a fineness of between about 180 m$^2$/kg and about 300 m$^2$/kg;
    mixing said interground quantities to form a homogeneous mixture;
    intergrinding said homogeneous mixture to a fineness of between about 350 m$^2$/kg and about 500 m$^2$/kg; and
    admixing a quantity of said homogeneous mixture with class C fly ash to produce an ultimate blended cement capable of meeting ASTM C-595 and ASTM C-1157 sulfate resistance and ASR resistance standards, said volcanic ash and said class C fly ash in combination comprising about 50% of the total weight of said ultimate blended cement.

11. The method of claim 10, wherein said volcanic ash comprises between about 10% and about 30% of the total weight of said homogeneous mixture and said clinker comprises Type I or Type III portland cement clinker.

12. The method of claim 10, wherein said volcanic ash comprises about 25% of the total weight of said homogeneous mixture and said clinker comprises Type I or Type III portland cement clinker.

13. The method of claim 10, wherein said particles comprise substantially hollow spheres.

14. A method of producing a blended cement comprising the steps of:
    providing a quantity of cementitious material, said material comprising an inactive volcanic ash that has been heated to between 800° F. and 1300° F., between about 40% and about 45% of said volcanic ash comprising particles unable to pass #325 sieve, said volcanic ash having a specific gravity of between about 1.7 g/cm$^3$ and about 1.8 g/cm$^3$ providing a quantity of portland cement clinker;
    providing a quantity of calcium sulfate;
    pretesting said quantity of said cementitious material, said quantity of said clinker and said quantity of said calcium sulfate to ensure that each of said quantities are suitable for use in construction applications under ASTM C-150;
    inserting said quantity of said cementitious material, said quantity of said clinker and said quantity of said calcium sulfate individuals into three separate vertical bins;
    utilizing weigh feeders, discharging each of said quantities onto a collecting belt;
    utilizing said collecting belt, transporting said quantities into a finish mill having a protective inner surface lining and at least one internal compartment;
    intergrinding said quantity of said cementitious material, said quantity of said clinker and said quantity of said calcium sulfate to a fineness of between about 180 m$^2$/kg and about 300 m$^2$/kg;
    further intergrinding said quantities to a fineness of between 350 m$^2$/kg and 500 m$^2$/kg; and
    mixing said interground quantities to form a homogeneous mixture.

15. The method of claim 14, further comprising the step of:
    admixing a quantity of said homogeneous mixture with class C fly ash to produce an ultimate blended cement capable of meeting ASTM C-595 and ASTM C-1157 sulfate resistance and ASR resistance standards, said volcanic ash and said class C fly ash in combination comprising about 50% of the total weight of said ultimate blended cement.

16. The method of claim 14, further comprising the step of:
    cooling said homogeneous mixture.

17. The method of claim 15, wherein said volcanic ash comprises Jackson Formation volcanic ash located in Atascosa County, Tex.

18. The method of claim 14, wherein said finish mill contains grinding balls having a diameter of between about ¾ inches and about 4 inches.

19. The method of claim 14, wherein said finish mill has a length to diameter ratio of about 1 to 3.

20. The method of claim 14, further comprising the additional step of:
    classifying said homogeneous mixture.

* * * * *